United States Patent [19]

Mori et al.

[11] 4,122,152
[45] Oct. 24, 1978

[54] PROCESS FOR PREPARING SILICON NITRIDE POWDER HAVING A HIGH α-PHASE CONTENT

[75] Inventors: Masaaki Mori, Hadano; Norihira Takai, Yamato, both of Japan

[73] Assignee: Toshiba Ceramics Co., Ltd., Tokyo, Japan

[21] Appl. No.: 763,094

[22] Filed: Jan. 27, 1977

[30] Foreign Application Priority Data

Jan. 27, 1976 [JP] Japan .................................. 51-7694

[51] Int. Cl.² ............................................ C01B 33/06
[52] U.S. Cl. .................................................. 423/344
[58] Field of Search ........................................ 423/344

[56] References Cited

U.S. PATENT DOCUMENTS

| 928,476 | 7/1909 | Larsen | 423/344 |
| 3,244,480 | 4/1966 | Johnson et al. | 423/344 |
| 3,839,541 | 10/1974 | Lumby et al. | 423/344 |
| 3,959,446 | 5/1976 | Mazdiyasni et al. | 423/344 |

FOREIGN PATENT DOCUMENTS 15,641 of 1910 United Kingdom ..................... 423/344

OTHER PUBLICATIONS

Komeya et al., "Synthesis of the α-form of Silcon Nitride from Silica" (Toshiba Res. Dev. Cent., Tokyo Shibaura Electr. Co., Ltd., Kawasaki, Japan), J. Mater. Sci. 1975, 10(7), 1243–1246, (Eng.) (Chem. Abs.).

Primary Examiner—O. R. Vertiz

[57] ABSTRACT

A process for preparing silicon nitride powder having a high α-phase content which comprises the steps of (a) providing a blended powder material composed of silica powder and amorphous carbon powder having an oil absorption of not less than 100 ml/100g, the weight ratio of the carbon powder to the silica powder being not less than 0.5, and then (b) nitriding and burning the blended powder material by heating in at a temperature of from 1300° to 1700° C while feeding a nitrogen-containing, non-oxidizing gas. The product obtained by this process is suitable as a raw material for the manufacture of high-density and high-strength sintered articles of silicon nitride.

9 Claims, 2 Drawing Figures

PROCESS FOR PREPARING SILICON NITRIDE POWDER HAVING A HIGH α-PHASE CONTENT

BACKGROUND OF THE INVENTION

This invention relates to a process for preparing silicon nitride powder having a high α-phase content and, more particularly, to a process for preparing silicon nitiride powder having a high α-phase content which powder is suitable as a raw material for the manufacture of high-density and high-strength sintered articles of silicon nitride.

In general, silicon nitride powder having a high α-phase content is suitable as a raw material for the manufacture of high-density and high-strength sintered articles of silicon nitride, because of its excellent sinterability and reactivity.

Conventionally, there has been the process for preparing silicon nitride powder, commonly called the "silica reduction process", which comprises blending silica powder and graphite powder at a stoichiometric ratio ($C/SiO_2$) of 0.4 by weight and heating the blend in a nitrogen atmosphere whereby the active silicon-containing vapor resulting from the reduction of the silica powder by the graphite powder is caused to react with the nitrogen. However, the silicon nitride powder prepared by this silica reduction process has a low content of $\alpha\text{-}Si_3N_4$ and contains unreacted $SiO_2$ or $Si_2ON_2$, so that its quality is too low for sintering use.

On the other hand, the following two processes for preparing silicon nitride powder having a high α-phase content have recently been proposed. One of them is to heat metallic silicon powder in a nitrogen atmosphere while controlling the partial pressure of nitrogen gas whereby the silicon powder is directly nitrided at a temperature of 1300° C. or below. The other is to bring silicon tetrachloride into contact with ammonia gas at a temperature of 1500° C. or below. However, neither of these processes has practical utility partly because the reaction rate is too low to achieve a satisfactory production efficiency and partly because the equipment employed to effect the reaction is complicated and expensive.

SUMMARY OF THE INVENTION

Accordingly, it is an object of this invention to provide a process for easily and efficiently preparing silicon nitride powder having a high α-phase content which powder is suitable as a raw material for the manufacture of high-density and high-strength sintered articles of silicon nitride.

According to the present invention, there is provided a process for preparing silicon nitride powder having a high α-phase content which comprises the steps of (a) providing a blended powder material composed of silica powder and amorphous carbon powder having an oil absorption of not less than 100 ml/100g, the weight ratio of said carbon powder to said silica powder being not less than 0.5 and preferably from 1 to 3, and then (b) nitriding and burning said blended powder material by heating it at a temperature of from 1300° to 1700° C. while feeding a nitrogen-containing, non-oxidizing gas.

DETAILED DESCRIPTION OF THE PREFERRED EMBODIMENTS

Figure 1:
FIG. 1 is an electron micrograph of the powdery product obtained in Example 7.

The present invention is based on the discovery that, in the silica reduction process which comprises heating a blended powder material composed of silica powder and carbon powder in a nitrogen atmosphere, silicon nitride powder having a high α-phase content and containing very little unreacted $SiO_2$ can be very easily prepared by using amorphous carbon powder having an oil absorption of 100 ml/100g as the carbon powder and rendering the weight ratio of the carbon powder to the silica powder not less than 0.5 and preferably from 1 to 3. This is so because the silica powder is reduced to produce an active silicon-containing vapor having an adequate SiO concentration and a low CO concentration due to the low silica fraction of the blended powder material and this silicon-containing vapor is then caused to react with the nitrogen abundantly adsorbed in the carbon powder having a high oil absorption. The above-mentioned oil absorption is defined as being measured according to JIS (Japanese Industrial Standard) K6221-1970, Procedure B, and expressed in terms of the volume (in milliliters) of dubutyl phthalate required to fill up the voids contained in 100g of the carbon black.

The process of the invention is more specifically described below.

First of all, silica powder and amorphous carbon powder having an oil absorption of not less than 100 ml/100g are placed in a mixer such as V-type mixer or ball mill, and wet- or dry-blended well to form a blended powder material. The weight ratio ($C/SiO_2$) of the carbon powder to the silica powder is rendered not less than 0.5 and preferably from 1 to 3. Then, this blended powder material is charged in a dishlike vessel made of material having resistance to heat and to chemical attack, such as carbon or silicon nitride. The vessel is placed, for example, in a tube furnace and heated at a temperature of from 1300° to 1700° C. for a desired period of time while a nitrogen-containing, non-oxidizing gas is being fed to the tube furnace. As a result, the silica powder included in the blended powder material is reduced at such a high temperature by the carbon powder to produce a silicon-containing vapor. This silicon-containing vapor is then caused to react with the nitrogen existing in the nitrogen-containing, non-oxidizing gas whereby silicon nitride having a high α-phase content is obtained. In order to bring the nitrogen-containing, non-oxidizing gas into close contact with the whole blended powder material and prevent carbon monoxide from being locally concentrated in the blended powder material during the above-mentioned nitriding and burning step, it is desirable to charge the blended powder material in a dishlike vessel to a thickness of not greater than 5 cm and preferably not greater than 2 cm. The nitrogen-containing, non-oxidizing gas may be nitrogen gas, ammonia gas, and gaseous mixtures of nitrogen gas and an inert gas such as argon gas, neon gas, or the like. This nitrogen-containing, non-oxidizing gas is preferably fed at a flow velocity of not less tha 2.0 cm/sec so that silicon nitride may be efficiently produced by keeping down the CO gas concentration around the blended powder material and thus preventing the formation of SiC or $Si_2ON_2$ during the nitriding and burning step.

Then, the silica powder, carbon powder, and burning conditions are described in greater detail.

Silica Powder

The silica powder which is used in the blended powder material may be non-crystalline silica powder such as volatilized silica powder, anhydrous silica powder prepared by gas phase synthesis, silica powder prepared by chemical precipitation and the like, as well as crystalline silica powder such as ground siliceous sand and the like. Ground rock crystal and ground silica glass are not suitable for use in the present invention, because their use results in a high proportion of $\beta$-silicon nitride and a decrease in reaction rate. Especially when volatilized silica powder is used, finely divided silicon nitride powder can be obtained. The reason for this is as follows: Volatilized silica powder is fine in particle size, and highly irregular in atomic arrangement because it is a silica powder prepared by cooling a gas containing SiO, Si, $SiO_2$ and $O_2$ in a hot, vaporized state. Therefore, volatilized silica powder shows good reactivity so that a high reaction rate is achieved. As a result, the rate of nucleation of silicon nitride is increased to produce finely divided silicon nitride powder. On the contrary, a low reaction rate decreases the rate of nucleation so that the rate of crystal growth from each nucleus shows a relative increase and results in the formation of coarse crystals of silicon nitride.

Carbon Powder

The carbon powder which is used in the blended powder material may be any type of carbon black that has an oil absorption of not less than 100 ml/100g. For example, lamp black, channel black, acetylene black, and the like may be used. Generally, the oil absorption increases as the particles become finer and as the structure becomes higher.

Especially when lamp black having an oil absorption of not less than 100 ml/100g is used as the carbon powder, finely divided silicon nitride powder can be obtained. The reason for this is as follows: Although lamp black is comparatively large in particle diameter among various types of carbon black, it has particularly high structure and underdeveloped crystallites. Therefore, lamp black shows good reactivity and has the great ability to adsorb and retain nitrogen gas (which is an essential reactant) and SiO gas (which is an intermediate product), so that the reaction in the system is accelerated. As a result, the rate of nucleation of silicon nitride is greatly increased to produce finely divided silicon nitride powder.

In order to measure the oil absorption of carbon powder, the following procedure is employed in the present invention.

JIS (Japanese Industrial Standard) K6221-1970, Procedure B

A sample of 1.00 ± 0.01g of dry carbon powder is accurately weighed out, and placed on a smooth glass or stone plate which is about 300 × 300 mm or more in size. If the sample is granular, a spatula is used to crush the granules under appropriate pressure. The spatula, which is made of stainless steel, consists of a tapered blade about 100 to 1,500 mm wide and a handle. From a buret (2 to 5 ml microburet having a minimum scale of 0.01 ml or less), about ⅓ of the expected necessary volume of dibutyl phthalate (DBP) is gently poured on the glass or stone plate, and uniformly spread in circular form. Then, the sample is moved into the DBP little by little and carefully mixed by manipulating the spatula in such a manner as to draw small circles. Next, about ¼ to ⅓ of the initial volume of DBP is added, and the same operation is repeated until a uniform mixture is obtained. As the end point is approached, DBP is added in drops, and as the end point is more approached, it is added in half drops. The end point is reached when the whole sample has formed a firm mass. This procedure should be completed in 10 to 15 minutes. Three minutes after the completion of the procedure, the volume of DBP delivered from the buret is read and the oil absorption is calculated according to the following equation.

$$OA = V/W \times 100$$

where $OA$: The oil absorption (ml/100g) of the dry sample.
$V$: The volume (ml) of oil used until the end point is reached.
$W$: The weight (g) of the dry sample.

If linseed oil is to be used in place of DBP, it should have an acid number of 3 or less.

Burning Conditions

According to the process of this invention, the temperature required for burning in a nitrogen atmosphere is from 1300° to 1700° C. At temperatures below 1300° C., the rate of formation of silicon nitride is too low to yield silicon nitride powder efficiently, while at temperatures above 1700° C., $\beta$-silicon nitride is formed in increasing proportions. If volatilized silica powder is used as the silica powder and lamp black is used as the carbon powder, a burning temperature of from 1300° to 1700° C. is satisfactory because of teir very good reactivity. But, if other types of silica powder and carbon powder are used, a burning temperature of from 1350° to 1700° C. is preferred for the purpose of achieving a high rate of formation of silicon nitride.

When the blended powder material is burned at a temperature of from 1300° to 1550° C., the silica powder is reduced by the amorphous carbon powder to produce a silicon-containing vapor, which then reacts with nitrogen to form $\alpha$-silicon nitride. As a result, most of the product is constituted by $\alpha$-silicon nitride. If the burning temperature exceeds 1550° C., the silicon-containing vapor reacts with the amorphous carbon powder to form silicon carbide in increasing proportions, so that the resulting product is a mixed powder of silicon nitride and silicon carbide. In such a case, however, the silicon nitride included in the product shows a high $\alpha$-phase content of not less than 75% so long as the burning temperature is not higher than 1700° C. Furthermore, the rate of temperature rise in the region of 1300° C. and above is preferably rendered not greater than 100° C./hr so that silicon nitride powder having a high $\alpha$-phase content may be yielded.

The burning time may be suitably determined according to the composition of the blended powder material, the burning temperature, and other factors. For example, if blended powder materials in which the weight ratio of amorphous carbon powder to silica powder is 4 are burned at a temperature of 1600° C., it is desirable to select a burning time of 1 hour or more. However, if blended powder materials in which the weight ratio of amorphous carbon poroder to silica powder is 2 are burned at a temperature of from 1450° to 1500° C., it is desirable to select a burning time of 5 hours or more.

The product obtained by nitriding and burning in this manner contains a large amount of residual carbon.

Therefore, the silicon nitride may be purified, for example, by removing the residual carbon in the following manner: The product is cooled to a temperature of 800° C. and preferably 550° to 800° C. in the nitrogen-containing, non-oxidizing atmosphere. Then, the atmosphere is changed to an oxidizing atmosphere so that the residual carbon contained in the product may be oxidized and thereby removed. On that occasion, the nitrogen-containing, non-oxidizing atmosphere should not be changed to an oxidizing atmosphere at temperatures above 800° C. If so, the silicon nitride or silicon carbide contained in the product will be oxidized to form silica, thus resulting in a marked reduction in yield of silicon nitride.

The silicon nitride powder prepared by the above-described process of this invention is characterized by an α-phase content of not less than 75% and a nitrogen content of not less than 33% by weight. When this silicon nitride powder is sintered the improvement of sintered strength and the creation of a uniform and defect-free structure are achieved so that high-density and high strength sintered articles of silicon nitride having excellent high-temperature strength, chemical stability, and resistance to thermal shock are obtained. Especially when volatilized silica powder is used as the silica powder, finely divided silicon nitride powder having an average particle size of not greater than 3 μm is yielded. The greater part of this silicon nitride powder is constituted either by fibrous or acicular elongated particles having a thickness of not greater than 1 μm or by such elongated particles and fine granular particles having a diameter of not greater than 1 μm. When this finely divided silicon nitride powder is sintered, the resulting sintered articles of silicon nitride shows particularly excellent characteristics.

The present invention is further illustrated by the following examples.

EXAMPLES 1 TO 6

Six types of amorphous carbon powder were provided which included acetylene black having an oil absorption of 384 ml/100g, channel black having an oil absorption of 194 ml/100g, and four types of lamp black having oil absorptions of 131 ml/100g, 139 ml/100g, 166 ml/100g, and 250 ml/100g respectively. Each of them and silica powder prepared by gas phase synthesis were mixed at a weight ratio (C/SiO$_2$) of 4, wet-blended for 1 hour with a magnetic stirrer, and then dried and crushed to form six blended powder materials. After each blended powder material was charged in a dishlike vessel made of silicon nitride to a thickness of 5 mm, this vessel was placed in a tube furnace having a diameter of 30 mm. While nitrogen gas was being fed to this tube furnace at a flow velocity of 7.6 cm/sec, the furnace temperature was raised at a rate of 400° C./hr and held at 1400° C. for 5 hours whereby the blended powder material was nitrided and burned. Then, the tube furnace was cooled to 700° C. with nitrogen gas being still fed and kept at that temperature for 14 hours, during which air instead of nitrogen gas was introduced to burn off the residual carbon. As a result, six powdery products were obtained.

For purposes of comparison, graphite powder having an oil absorption of 44 ml/100g was blended with the same type of the silica powder at a weight ratio (C/SiO$_2$) of 4. The resulting blended powder material was nitrided and burned in the same manner as described above. As a result, a powdery product was obtained (Control 1).

The products of Examples 1 to 6 and the product of Control 1 were subjected to an identification test by X-ray diffractometry. This revealed that all the products of Examples 1 to 6 consisted essentially of silicon nitride while the product of Control 1 contained large amounts of silicon carbide, α-cristobalite, and non-crystalline silica in addition to silicon nitride.

The products of Examples 1 to 6 were further examined by means of an electron microscope. Thus, their morphology was found to be such that the powder consisted of needles (0.1 to 2 μm in thickness), fibers (0.2 to 5 μm in thickness), granules (0.1 to 4 μm in diameter), hexagonal prisms (0.5 to 10 μm in average diameter), and the like. Among these, needles and fibers predominated in the powder.

Next, the silicon nitride contents in the products of Examples 1 to 6 and the product of Control 1 were analyzed by X-ray diffractometry to determine the degree of conversion to α-silicon nitride (or α-phase content). The results are given in Table 1. In calculating the degree of conversion to α-silicon nitride, the intensities Iα(102) and Iα(210) of the (102) and (210) diffraction lines of α-Si$_3$N$_4$ as well as the intensities Iβ(101) and Iβ(210) of the (101) and (210) diffraction lines of β-Si$_3$N$_4$ were obtained from an X-ray diffraction pattern of the powder sample and substituted into the following equation.

Degree of Conversion to a-Silicon Nitride (%) =

$$\frac{I\alpha(102) + I\alpha(210)}{I\alpha(102) + I\alpha(210) + I\beta(101) + I\beta(210)} \times 100$$

Table 1

| | Carbon powder | | Degree of Conversion to α-Silicon Nitride (%) |
|---|---|---|---|
| | Type | Oil Absorption (ml/100g) | |
| Example 1 | Acetylene black | 384 | 88 |
| Example 2 | Channel black | 194 | 87 |
| Example 3 | Lamp black | 131 | 87 |
| Example 4 | Lamp black | 139 | 89 |
| Example 5 | Lamp black | 166 | 76 |
| Example 6 | Lamp black | 250 | 93 |
| Control 1 | Graphite | 44 | 34 |

As is evident from Table 1, the degree of conversion to α-silicon nitride was as high as 76% or more for the products (Examples 1 to 6) obtained by the process of this invention, while it was as low as 34% for the product of Control 1 in which graphite powder having an oil absorption of 44 ml/100g was used as the carbon powder.

EXAMPLES 7 TO 9

Volatilized silica powder having a composition as shown in Table 2 and an average particle size of about 0.1 μm was used as the silica powder and each of several types of carbon black as shown in Table 3 was used as the carbon powder. Both powders were mixed at a weight ratio (C/SiO$_2$) of 3 and dry-blended in a V-type mixer to form six blended powder materials (Examples 7 to 9 and Controls 2 to 4). After each blended powder material was charged in a dishlike vessel made of graphite to a thickness of 5 mm, this vessel was placed in a tube furnace having a diameter of 50 mm. While nitrogen gas was being fed to this tube furnace at a flow velocity of 2 cm/sec, the furnace temperature was raised at a rate of 100° C./hr and held at 1500° C. for 5 hours whereby the blended powder material was nitrided and burned. Then, the tube furnace was cooled to 700° C. with nitrogen gas being still fed. Thereafter, the resulting powder was charged in a vessel made of silica glass and kept at 700° C. for 14 hours in air to burn off the residual carbon. As a result, six powdery products were obtained.

These products were subjected to an identification test by X-ray diffractometry and an analysis for nitrogen. The results are given in Table 4.

Table 2

Composition of Valatilized Silica Powder
(Average particle size: About 0.1 μm)

| $SiO_2$ | $Al_2O_3$ | $Fe_2O_3$ | MgO | CaO | $Na_2O$ | $K_2O$ | Ignition Loss |
|---|---|---|---|---|---|---|---|
| 99.5% | 0.004% | 0.02% | 0.002% | 0.002% | 0.01% | 0.05% | 0.47% |

Table 3

| | Carbon Black | | | | | |
|---|---|---|---|---|---|---|
| | Type | Ash Content (%) | Oil Absorption ml/100g | Metal Content (ppm) | | | |
| | | | | Al | Fe | Mg | Ca |
| Ex. 7 | Lamp black | 0.07 | 250 | 24 | 230 | 2 | 18 |
| Ex. 8 | Acethylene black | 0.04 | 384 | 12 | 44 | 4 | 29 |
| Ex. 9 | Channel black | 1.53 | 194 | 6 | 42 | 8 | 3820 |
| Control 2 | Lamp black | 1.75 | 63 | 540 | 6170 | 110 | 210 |
| Control 3 | Thermal black | 0.13 | 35 | 22 | 210 | 6 | 18 |
| Control 4 | Furnace black | 0.23 | 70 | 9 | 61 | 9 | 52 |

Table 4

| | X-ray Diffraction Peak Intensity | | | | Degree of Conversion to α-Silicon Nitride (%) | Nitrogen Content (%) |
|---|---|---|---|---|---|---|
| | $\alpha$-$Si_3N_4$ | $\beta$-$Si_3N_4$ | α-Cristobalite | SiC | | |
| Ex. 7 | ++++ | + | — | — | 93 | 37.2 |
| Ex. 8 | ++++ | + | — | — | 92 | 36.6 |
| Ex. 9 | ++++ | + | — | — | 92 | 37.3 |
| Control 2 | +++ | + | + | ++ | 89 | 31.3 |
| Control 3 | +++ | + | + | — | 70 | 29.8 |
| Control 4 | +++ | ++ | — | — | 63 | 35.1 |

Ratings of X-ray diffraction peak intensity:
++++ > +++ > ++ > + > — (no peak)

As is evident from Table 4, the degree of conversion to α-silicon nitride was 92% or more for the products of Examples 7 to 9, and no detectable amounts of α-cristobalite and SiC were found in those products.

Next, the average particle sizes of the products of Examples 7 to 9 were measured by means of the Fisher Sub-Sieve Sizer (FSSS), and their morphologies were also examined by means of an electron microscope. The results are given in Table 5. Also, an electron micrograph (X5,000) of the powdery product of Example 7 is presented in FIG. 1. The line shown in this figure has a dimension of 4 μm.

Table 5

| | Average Particle Size (μm) | Morphology of Product |
|---|---|---|
| Ex. 7 | 1.7 | Fibers (about 0.3 μm in thickness) Ultrafine portions of irregular shape (<0.3 μm in diameter) |
| Ex. 8 | 2.9 | Rods (about 1 to 2 μm in thickness) Needles (about 0.8 μm in thickness) Fine particles of irregular shape (about 0.8 μm in diameter) |
| Ex. 9 | 2.6 | Fibers (about 0.7 μm in thickness) Fine particles of irregular shape (about 0.7 μm in diameter) |

As is evident from the Table 5, the product of Example 7 in which lamp black having an oil absorption of 250 ml/100g was used as the carbon powder was the most finely divided silicon nitride powder.

EXAMPLES 10 TO 13

The same type of carbon black as in Example 7 was used as the carbon powder and each of three types of silica powder as shown in Table 6 was used as the silica powder. The resulting blended powder materials were nitrided and burned in the same manner as in Examples 7 to 9. Then, the degree of conversion to α-silicon nitride and the nitrogen content were determined with respect to each product. The results are given in Table 7. Tables 6 and 7 include Example 7 for purposes of comparison.

Table 6

| | Silica Powder |
|---|---|
| Ex. 7 | Volatilized silica powder |
| Ex. 10 | Silica powder prepared by gas phase synthesis<br>Average particle size : About 0.01 μm<br>Ignition loss : 0.139%<br>Composition :<br>$SiO_2$ 99.8%  $Al_2O_3$ 0.04%  $Fe_2O_3$ 0.001%  $TiO_2$ 0.02% |
| Ex. 11 | Silica powder prepared by chemical precipitation<br>Average particle size : 0.9 μm<br>Ignition loss : 0.034%<br>Composition :<br>$SiO_2$ 99.9%  $Al_2O_3$ 0.005%  $Fe_2O_3$ 0.001%  $Na_2O$ 0.06% |
| Ex. 12 | Ground siliceous sand<br>Average particle size : 12 μm<br>Ignition loss : 0.09%<br>Composition :<br>$SiO_2$ 97.5%  $Al_2O_3$ 0.7%  $Fe_2O_3$ 0.4%  MgO 0.08%  CaO 0.03%  $Na_2O$ 0.4%  $K_2O$ 0.6% |

Table 7

| | Silica Powder | Degree of conversion to α-Silicon Nitride (%) | Nitrogen content (%) |
|---|---|---|---|
| Ex. 7 | Volatilized silica powder | 93 | 37.6 |
| Ex. 10 | Silica powder prepared by gas phase synthesis | 96 | 37.6 |
| Ex. 11 | Silica powder prepared by chemical precipitation | 90 | 35.1 |
| Ex. 12 | Ground siliceous sand | 88 | 34.8 |

As is evident from Table 7, any of the three types of silica powder gave a satisfactorily high degree of conversion to α-silicon nitirde.

In the same manner as in Examples 7 to 9, the average particle sizes of the products of Examples 10 to 12 were measured and their morphologies were examined. The results are given in Table 8.

Table 8

| | Average Particle size (μm) | Morphology of Product |
|---|---|---|
| Ex. 7 | 1.7 | Fibers (about 0.3 μm in thickness) Ultrafine particles of irregular shape (<0.3 μm diameter) |
| Ex. 10 | 3.1 | Fibers (about 1.5 μm in thickness) Ultrafine particles of irregular shape (about 1 μm in diameter) |
| Ex. 11 | 4.9 | Rods (1 to 3 μm in thickness) Irregular granules (about 5 μm in diameter) |
| Ex. 12 | 5.7 | Ribbons (about 10 μm in width) Needles (about 0.8 μm in thickness) |

As is evident from Table 8, the product of Example 7 in which volatilized silica powder was used as the silica powder was the most finely divided silicon nitride powder.

EXAMPLE 13

Figure 2:
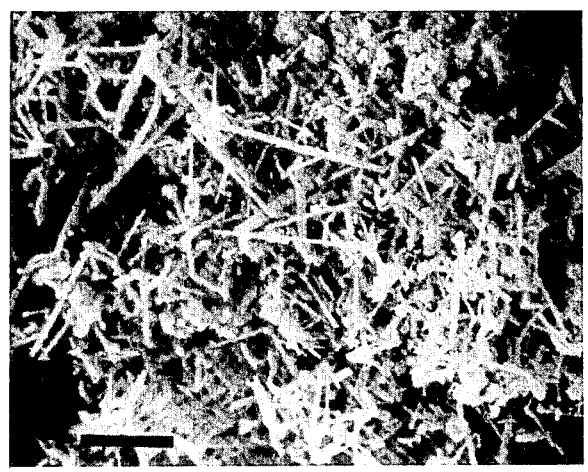
FIG. 2 is an electron micrograph of the powdery product obtained in Example 13.

A mixture consisting of 50% by weight of silica powder prepared by vapor phase synthesis and 50% by weight of volatilized silica powder was used as the silica powder. The resulting blended powder material was nitrided and burned in the same manner as in Examples 7 to 12, and various characteristics of the product was determined. As a result, the degree of conversion to α-silicon nitride was 95%, the nitrogen content was 37.6%, and the average particle size was 1.8 μm. Moreover, as shown in FIG. 2, the morphology examined by means of an electron microscope was such that the powder consisted of fibers (0.3 μm in thickness) and ultrafine particles of irregular shape (about 0.3 μm in diameter).

What we claim is:

1. A process for preparing silicon nitride powder having a high α-phase content which comprises the steps of (a) providing a blended powder material composed of silica powder and amorphous carbon powder having an oil absorption of not less than 100 ml/100g, the weight ratio of said carbon powder to said silica powder being from 1 to 3, and then (b) nitriding and burning said blended powder material by heating it at a temperature of from 1300° to 1700° C. in the presence of a nitrogen-containing, non-oxidizing gas.

2. A process as claimed in claim 1 wherein said silica powder is volatilized silica powder and said amorphous carbon powder is lamp black.

3. A process as claimed in claim 1 wherein said nitrogen-containing, non-oxidizing gas is a gas selected from the group consisting of nitrogen gas, ammonia gas, and gaseous mixtures of nitrogen gas and an inert gas.

4. A process as claimed in claim 1 wherein said nitriding and burning step is carried out at a temperature of from 1350° to 1700° C.

5. A process as claimed in claim 1 wherein said nitriding and burning step is carried out at a temperature of from 1300° to 1550° C.

6. A process as claimed in claim 1 wherein said silica powder is a silica power selected from the group consisting of volatilized silica powder, silica powder prepared by gas phase synthesis, silica powder prepared by chemical precipitation, and ground siliceous sand.

7. A process as claimed in claim 6 wherein said silica powder is volatilized silica powder.

8. A process as claimed in claim 1 wherein said amorphous carbon powder is a carbon black selected from the group consisting of acetylene black, channel black, and lamp black.

9. A process as claimed in claim 8 wherein said amorphous carbon powder is lamp black.

* * * * *